(12) United States Patent
Okamoto et al.

(10) Patent No.: US 6,423,408 B2
(45) Date of Patent: Jul. 23, 2002

(54) COMPOSITE MOLDING AND PROCESS FOR THE PRODUCTION OF THE SAME

(75) Inventors: Hiroshi Okamoto, Owari-asahi; Shin-ichi Inoue, Tokoname; Tetsuo Kanagawa, Otsu; Masataka Sano, Hamamatsu; Hiroki Miyamatsu, Hamamatsu; Kimi Yoshida, Hamamatsu, all of (JP)

(73) Assignee: Kabushiki Kaisha Erubu, Hamamatsu (JP)

( * ) Notice: Subject to any disclaimer, the term of this patent is extended or adjusted under 35 U.S.C. 154(b) by 0 days.

(21) Appl. No.: 09/725,255

(22) Filed: Nov. 29, 2000

(30) Foreign Application Priority Data

Nov. 30, 1999 (JP) .............................................. 11-340849
Dec. 9, 1999 (JP) .............................................. 11-350697

(51) Int. Cl.⁷ .................................................. D01F 8/00
(52) U.S. Cl. ........................ 428/370; 428/373; 428/374
(58) Field of Search ................................. 428/370, 373, 428/374; 523/102; 424/405; 426/49

(56) References Cited

U.S. PATENT DOCUMENTS

| 5,747,053 A | * | 5/1998 | Nashimoto et al. | ......... 424/405 |
| 5,888,527 A | * | 3/1999 | Nashimoto et al. | ......... 424/405 |
| 6,156,817 A | * | 12/2000 | Okamoto et al. | ............ 523/102 |
| 6,254,902 B1 | * | 7/2001 | Hodges | ........................ 426/49 |

FOREIGN PATENT DOCUMENTS

JP  7-148407  6/1995

* cited by examiner

*Primary Examiner*—N. Edwards
(74) *Attorney, Agent, or Firm*—Armstrong, Westerman & Hattori, LLP

(57) ABSTRACT

A joining type composite molding is disclosed, containing an internal component X and an external component Y, wherein the internal component X is formed from a first resin (H); the external component Y is formed from a second resin (L) compounded with at least one functional component (A) selected from the group consisting of a catechin, a saponin, a tea-leaf powder, a tea-leaf extract and tannin (tannic acid), and a ceramics component (C); and the first resin (H) and the second resin (L) are resins falling into different categories respectively, or a resin of the same category of a non-polyolefinic resin.

6 Claims, 1 Drawing Sheet

(i)

(ii)

(i)

(ii)

COMPOSITE MOLDING AND PROCESS FOR THE PRODUCTION OF THE SAME

BACKGROUND OF THE INVENTION

1. Field of the Invention

The present invention relates to a core-sheath joining type or bimetal joining type composite molding (especially, filaments and sheets) having superior functionalities (e.g., deodorizing properties, antimicrobial properties, etc.), moldability (e.g., melt spinning properties, etc.), post-processing properties (e.g., stretching properties, etc.), physical properties (e.g., strength, dimensional stability, etc.), and economy (i.e., cost), which is useful for various applications including interior materials of vehicles or interiors, clothes, matting materials, hygienic materials, and filters of air conditioners or air cleaners, and to a process for the production of the same.

2. Description of the Conventional Art (Filters Made of Polypropylene)

As filters to be incorporated into air conditioners or air cleaners, filters made of a polypropylene filament that is not only advantageous from the standpoint of production cost but also superior in characteristics such as moldability, mechanical strength, waterproof properties, and chemical resistance, are widely used. It is also known that polypropylene for this filter is incorporated with a synthetic bactericide or carried with a catechin as a tea-extraction component, through external attachment or internal addition.

For example, Japanese Patent Laid-Open No. 99656/1989 mentions an antibacterial electret filter comprising polypropylene fibers having 0.1% or more of a bactericide incorporated therein. However, the bactericide that is used in the examples of this laid-open publication is thiabendazole as a synthetic bactericide.

Further, Japanese Patent Laid-Open No. 148407/1995 describes an antiviral filter comprising a filter impregnated with, or a filter material incorporated with, a virus-inactivating agent comprising, as an active ingredient, a tea-extraction component. The tea-extraction component as referred to herein means a tea polyphenol such as a catechin. In the examples of this patent laid-open are given (A) an example in which the tea-extraction component is dissolved in water to prepare an aqueous solution, which is then impregnated and attached to an electret filter; and (B) an example in which polypropylene is mixed with the tea-extraction component, and the mixture is molten to form a film, which is then cut and fabricated into a non-woven fabric.

Moreover, Japanese Patent Laid-Open No. 266828/1996 describes an antiviral filter comprising a dust-collecting filter and a filter impregnated with a tea-extraction component. The tea-extraction component as referred to herein means a tea polyphenol such as a catechin. Further, the filer having a tea-extraction component attached thereto as referred to herein means electret filter, HEPA filter, high-performance filer, middle-performance filter, bag filter, etc.

(Composite Monofilaments Made ofPolypropylene)

In general, a core-sheath joining type or bimetal joining type composite monofilament per se is known. For instance, Japanese Patent Publication No. 3969/1988 (Japanese Patent No. 1,456,233) describes a composite monofilament comprising high-melting polypropylene as a core component and a low-melting polyolefin as a sheath component. This patent publication also mentions that this monofilament is fabricated in a net-like state. However, this patent publication does not describe that the monofilament is carried with an active ingredient such as a bactericide. In this monofilament, since not only a necessary strength is obtained by the core component, but also heat fusion properties are obtained by the sheath component, it is easy to fabricate it into a net-like state or a non-woven fabric-like state.

In the case where the tea-extraction component is dissolved in water to prepare an aqueous solution, which is then externally impregnated and carried in a filter, namely, in the attachment and carrying method by impregnation, the tea-extraction component is compatible with water, and hence, fixing properties and waterproof properties are not sufficient. Therefore, when this filter is used in contact with water, or in washing with water, it involves such a defect that the tea-extraction component as an attaching component is readily lost.

In the method in which the tea-extraction component such as a catechin is internally added to (i.e., incorporated into) polypropylene as a filter material and then melt formed, since the tea-extraction component such as a catechin, which is originally soluble in water, is incompatible with polypropylene as a non-polar resin, it is likely to bleed out onto the filament surface to generate stains. Further, when the filament is dipped in water or washed with water, a major part of the extraction component elutes out, whereby the effect is drastically reduced. Even when the internal addition amount is increased taking into consideration of the bleeding-out, the elution amount is still high during contact with water. Accordingly, it is inevitable that not only the production cost is high, but also the spinning properties, stretching properties and strength are decreased. In addition, in this internal addition method, during the melt forming, a considerable amount of an effective part of the tea-extraction component is volatilized out, and hence, it is inevitable that the relatively expensive active ingredient is lost.

SUMMARY OF THE INVENTION

Under such circumstances, the present invention is aimed to provide a joining type (a core-sheath type or bimetal joining type) composite molding, in which bleeding of the internally added functional component is effectively inhibited; the internally added functional component does not adversely affect moldability (e.g., melt spinning properties, etc.), post-processing properties (e.g., stretching properties, etc.), and physical properties (e.g., strength, dimensional stability, etc.); the internal addition amount of the functional component can be greatly decreased, leading to an advantage from the standpoint of production cost; superior functionalities (e.g., deodorizing properties, antimicrobial properties, etc.), which the functional component inherently possesses, can be exhibited to the maximum extent; even when used upon contact with water, the composite molding is durable so that the functionalities can be kept over a long period of time; and even when used upon contact with a human body, the composite molding is high in safety. The present invention is also aimed to provide a process for the production of the joining type composite molding.

Specifically, the composite molding according to the present invention is a joining type composite molding comprising an internal component X and an external component Y, wherein the internal component X is formed from a first resin (H); the external component Y is formed from a second resin (L) compounded with at least one functional component (A) selected from the group consisting of catechin, saponin, tea-leaf powder, tea-leaf extract, and tannin (tannic acid), and ceramics component (C); and the first resin (H) and the second resin (L) are a resin falling within a scope different from each other, or a resin falling into the same scope of a non-polyolefinic resin.

The process for the production of the composite molding according to the present invention is characterized by co-extrusion forming a first resin (H) and a second resin (L) compounded with at least one functional component (A) selected from the group consisting of catechin, saponin, tea-leaf powder, tea-leaf extract, and tannin (tannic acid), and ceramics component (C) at a melting temperature higher than melting temperatures of the respective components, such that the first resin (H) becomes an internal component X and that the second resin (L) compounded with the functional component (A) and the ceramics component (C) becomes an external component Y, thereby obtaining a joining type composite molding constructed of the internal component X and the external component Y, wherein the first resin (H) and the second resin (L) are a resin falling into a scope different from each other, or a resin falling into the same scope of a non-polyolefinic resin.

DETAILED DESCRIPTION OF THE INVENTION

Figure 1:
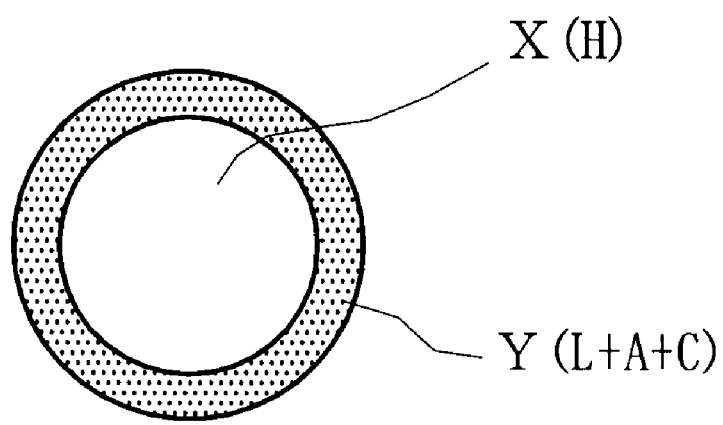
FIG. 1A is a schematically cross-sectional view of the composite molding (composite filament) obtained in Example 1.
FIG. 1B is a schematically cross-sectional view of the filament obtained in Comparative Example 1.
Figure 1:
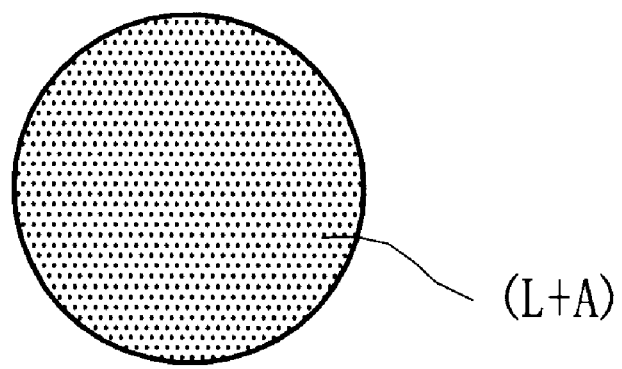

The present invention is described below in detail.
(Composite Molding)

The composite molding according to the present invention is a joining type composite molding constructed of an internal component X and an external component Y. The internal component X is formed from a first resin (H), and the external component Y is formed from a second resin (L) having a functional component (A) and the ceramics component (C) compounded therein. And, it is necessary that the first resin (H) and the second resin (L) are a resin falling within a scope different from each other, or a resin falling within the same scope of a non-polyolefinic resin. Representative examples of the "joining type" are a core-sheath joining type and a bimetal joining type.
(First Resin (H) and Second Resin (L))

As described above, it is necessary that the first resin (H) and the second resin (L) are a resin falling within a scope different from each other, or a resin falling within the same scope of a non-polyolefinic resin. From the standpoint of practical use, the first resin (H) and the second resin (L) are preferably a resin selected from polyamide-based resins, polyester-based resins, polyolefinic resins, polyurethane-based resins, polyvinyl chloride-based resins, polyvinylidene chloride-based resins, and acrylic resins. Of these are particularly preferred polyamide-based resins, polyester-based resins and polyolefinic resins. However, other various molding resins including polystyrenic resins (including ABS (acrylonitrile-butadiene-styrene) resins and AS (acrylonitrile-styrene) resins), polycarbonate-based resins, ethylene-vinyl alcohol copolymer-based resins, various heat-resistant resins, and various high-strength resins can also be used. The resin also includes thermoplastic elastomers. In this case, so far as these resins fall within the same scope, even when the grade is different, or the resins are blended with and modified by other resins, they are considered to be a resin falling within the same scope. For example, a difference between polyamide-based resins such as nylon 6 and nylon 66, or a difference between polyolefinic resins such as polyethylene and polypropylene, is not considered to be a difference in the scope of a resin. The reason why the case where both the first resin (H) and the second resin (L) are a polyolefinic resin is excluded from the scope of the present invention is in the fact that the present inventor filed previously an application for patent regarding such combination.

Of the above-exemplified resins, examples of the polyamide-based resins include nylon 6, nylon 66, nylon 6-66, nylon 610, nylon 612, nylon 11, nylon 12, nylon 46, nylon MXD6, and polyamide-based thermoplastic elastomers. Examples of the polyester-based resins include polyethylene terephthalate, polybutylene terephthalate, polyethylene naphthalate, and polyester-based thermoplastic elastomers. Examples of the polyolefinic resins include homopolymers or copolymers of an olefin, comprising, as the major component, ethylene or propylene, such as low-density polyethylene, linear low-density polyethylene, medium-density polyethylene, high-density polyethylene, ethylene-vinyl acetate copolymer, ethylene-acrylate copolymer, ionomers, copolymers comprising ethylene as a major component with propylene or α-olefins such as 1-butene, ethylene-1-butene copolymer, polypropylene comprising propylene as major component with ethylene or α-olefins such as 1-butene, and polyolefinic thermoplastic elastomers. Examples of the polyurethane-based resins include polyurethane-based thermoplastic elastomers. Examples of the acrylic resins include homopolymers or copolymers comprising, as the major component, (meth)acrylate or (meth)-acrylonitrile.

With respect to the melting points of the first resin (H) which will become the internal component X and of the second resin (L) which will become the external component Y, in many cases, the internal component X is responsible to ensuring the strength and stretching properties, while the external component Y is responsible to having the functionalities. Accordingly, it is possible to make the melting point of the first resin (H) higher (for example, from 5° C. to 10° C. or higher) than that of the second resin (L). In particular, when a resin having a low melting point but capable of being subjected to melt forming is used as the resin for the external component Y, there are advantages that not only the external component Y can be made to have heat fusion properties, but also the volatilization of the active ingredient in the functional component (A) during the melt forming can be suppressed. In this case, even when the melting point of the first resin (H) is made equal to or lower than that of the second resin (L), since the functional component (A) is contained in the external component Y, there is a significant advantage that the amount of the functional component (A) to be used can be made small. Accordingly, the melting point of the first resin (H) and that of the second resin (L) can be freely set up and arbitrarily determined depending upon the purpose.
(Functional Component (A))

As the functional component (A) is used at least one member selected from the group consisting of catechin, saponin, a tea-leaf powder, tea-leaf extract, and tannin (tannic acid). In Particular, catechin is important. These are a component having functionalities such as deodorizing properties (e.g., deodorizing properties, smell-eliminating properties, toxic gas-removing properties), antimicrobial properties (e.g., antibacterial properties, bactericidal properties, bacteriostatic properties, fungicidal properties, antiviral properties), physiological activity (e.g., antiallergic properties), and antioxidation properties.

Of these, as the catechin, are used monomeric compounds and oligomeric compounds (including theaflavin). Those that are particularly important as the catechin are tea-originated catechin formulations in which the catechin concentration is increased. The major components of the catechin are epigallocatechin, epigallocatechin gallate, epicatechin, epicatechin gallate, etc. Since these components are not required to be isolated from each other, a formulation containing the tea catechin in a high concentration, comprising a mixture of these components (preferably those containing 20% or more the tea catechin, and preferably those containing 25% or more of the tea catechin), can be suitably used as it stands. The tea-originated catechin formulation is readily available because the commercially available tea-originated catechin formulation includes 30% products, 50% products, 60% products, 70% products, 80% products, and 90% products. The catechin is contained in various kinds of plants other than teas, such as catechu, and hence, catechins originated from such plants are also useful.

Among the saponins, tea saponin can be obtained by extracting a saponin-containing component with an organic solvent or water from tea leaves or tea seeds and then repeatedly purifying it by means of column chromatography, etc. Though the tea saponin includes steroid-based saponin and triterepenoid-based saponin, any of them can be used for the object of the present invention. Since the saponin is also contained in various kinds of plants other than teas, such as ginseng (*ginseng radix*), panacis japonici rhizoma, soybean (*Glycine max* MERR.), bupleurum root (*bupleuri radix*), hydrangeae dulcis folium, loofah (*Luffa cylindrica M. Roemen*), polygala root (*polygalae radix*), platycodon root (*platicodi radix*), senega (*senegae radix*), ophiopogon tuber (*ophiopogonis tuber*), akebia stem (*akebiae caulis*), anemarrhena rhizome (*anemarrhenae rhizoma*), achyranthes root (*achyranthis radix*), licorice root (*glycyrrhizae radix*), and smilax rhizome (*smilacis rhizoma*), saponins made from these plants can also be used.

Examples of the tea-leaf powder or tea-leaf extract which can be used include powders or extracts of teas, such as the first pick of tea, the second pick of tea, the third pick of tea, deeply steamed tea, and kabusecha.

As the tannin (tannic acid), commercially available purified tannic acid can be used. Extracts or semi-purified products of natural plants containing tannic acid, such as Chinese gallotannin and Turkish gallotannin, can be used as they stand.

(Ceramics Component (C))

As the ceramics component (C) are useful in various kinds of ceramics. In this case, as described below in detail, a silica gel obtained via a hydrous silicate gel, a combination of an inorganic sintering aid and an inorganic flocculant, and a combination of ceramics particles, inorganic sintering aid and an inorganic flocculant are suitably used. When these ceramics are used, it is possible to realize complexation with the functional component (A) while utilizing a flocculation force.

As the silica gel is suitably used a silica gel obtained via a hydrous silicate gel. At this time, an aqueous solution of a silicate is mixed with an acid to adjust pH, and the thus obtained hydrous gel is further washed with water to remove ions and then dried to obtain a desired silica gel. Examples of the silicate include sodium silicate represented by $Na_2O \cdot nSiO_2$ and potassium silicate represented by $K_2O \cdot nSiO_2$, the former sodium silicate being particularly important. A concentrated aqueous solution of the silicate is generally called as a water glass, and typical commercially available water glasses have an $SiO_2$ content of from 22 to 38% by weight and an $Na_2O$ content of from 5 to 19% by weight.

Examples of the inorganic sintering aid include polyvalent metal salts of an inorganic acid such as phosphoric acid, sulfuric acid, nitric acid, and carbonic acid, and fluorides or silicofluorides of an alkali metal or an alkaline earth metal. As the polyvalent metal salts are suitably used those of aluminum, zinc, magnesium, calcium, or manganese. They are usually put into use in a state where a hydrous salt or hydrate is dissolved in water.

Suitable examples of the inorganic flocculant include inorganic flocculants in a state of sol or solution and particularly, silicic anhydride in a state of sol, or silicates (such as sodium silicate and potassium silicate) in a state of solution. The silicic anhydride in a state of sol includes not only usual colloidal silica that uses water as a medium but also an organosilica sol that uses an organic solvent such as an alcohol, as a medium.

Examples of the ceramics particles in the combination of ceramics particles, inorganic sintering aid and inorganic flocculant include various clay minerals, oxides, hydroxides, composite oxides, nitrides, carbides, silicides, borides, zeolite, cristobalite, diatomaceous earth, and polyvalent metal salts of silicic acid. Examples of the clayminerals include kaolin, agalmatolite, sericite, and bentonite. Examples of the oxides include alumina, titania, silica, zirconia, magnesia, and zinc oxide. Examples of the hydroxides include hydroxides of aluminum, zinc, magnesium, calcium, and manganese. Examples of the composite oxides include alums. Examples of the nitrides include silicon nitride and boron nitride. Examples of the polyvalent metal salts of silicic acid include aluminum salts, zinc salts, magnesium salts, calcium salts, and manganese salts.

With respect to the proportion of the respective components, in the combination of an inorganic sintering aid and an inorganic flocculant the amount of the inorganic flocculant is in many cases from about 100 to 300 parts by weight in terms of solids content, or more, based on 100 parts by weight of the solids content of the inorganic sintering aid. In the combination of ceramics particles, inorganic sintering aid and inorganic flocculant, those amounts at which the ceramics particles as the major component as well as the inorganic sintering aid and the inorganic flocculant can play the respective roles are employed. In many cases, the amounts of the inorganic sintering aid and the inorganic flocculant are from about 0.5 to 20 parts by weight and from 0.5 to 25 parts by weight in terms of solids content, respectively based on 100 parts by weight of the ceramics particles.

As other examples of the ceramics component (C), clay minerals having a nature of swelling upon absorption of water, such as sepiolite, vermiculite, bentonite, sericite clay, and mica of a water-swelling property, can be suitably used. Of these, sepiolite having a specific fibrous structure is particularly important.

Further, as the ceramics component (C), fine powders of ceramics particles such as silica, alumina, and titania can be used as they are.

(Composite Particles of Functional Component (A) and Ceramics Component (C))

As described previously, the internal component X is formed from the first resin (H), and the external component Y is formed from the second resin (L) having the functional component (A) and the ceramics component (C) compounded therein. Of these, in the external component Y, though the functional component (A) and the ceramics component (C) may be respectively compounded in the second resin (L), it is preferred that after composite particles comprising the functional component (A) and the ceramics component (C) have been prepared in advance, the composite particles are compounded in the second resin (L).

In the case where the composite particles are prepared, when the ceramics component (C) is a silica gel obtained via a hydrous silicate gel, it is desired that the functional component (A) is added to the system before, during or after mixing the silicate and the acid but before the completion of the gelation reaction, thereby containing the functional component (A) in the silica gel. Thus, the ceramics can be flocculated in a state containing the functional component (A).

In the case where the ceramics component (C) is a combination of an inorganic sintering aid and an inorganic flocculant, it is preferred that the ceramics are flocculated in a state containing the functional component (A). One example is given below. An aqueous solution of aluminum phosphate as an example of the inorganic sintering aid is mixed with the functional component (A) as a powder or an aqueous or alcoholic solution; the pH is adjusted at from 3 to 4; and is further mixed with a colloid solution of colloidal silica as an example of the inorganic flocculant, thereby making the system to have pH to an approximately neutral degree. At this time, since flocculation takes place, the flocculation product is placed in a crucible or on an evaporating dish and then subjected to a heat treatment in a dryer or an electric furnace until it has become dried.

In the case where the ceramics component (C) is a combination of ceramics particles, inorganic sintering aid and inorganic flocculant, it is preferred that the ceramics are flocculated in a state containing the functional component (A). One example is given below. An aqueous solution of aluminum phosphate as an example of the inorganic sintering aid is added to and kneaded with particles of ceramics such as aluminum silicate, alumina, and titania so as to have a viscosity to a degree of an approximately stiff paste, and subsequently, the kneaded mixture is mixed with the functional component (A) as a powder or an aqueous or alcoholic solution (alternatively, after mixing the functional component (A) with the ceramics particles, the inorganic sintering aid is kneaded therewith). Further, an aqueous solution of aluminum phosphate is additionally mixed, if desired. And, pH is adjusted at from 3 to 4, and is further mixed with a colloid solution of colloidal silica as an example of the inorganic flocculent, thereby making the system to have pH to an approximately neutral degree. At this time, since flocculation takes place, the flocculation product is placed in a crucible or on an evaporating dish and then subjected to a heat treatment in a dryer or an electric furnace until it has become dried.

(Proportions of Each of the Components in External Component Y)

With respect to the proportions of the second resin (L), the functional component (A) and the ceramics component (C) accounting for in the external component Y, it is desired that the total amount of the functional component (A) and the ceramics component (C) is from 1 to 40 parts by weight (preferably from 2 to 30 parts by weight) based on 100 parts by weight of the second resin (L). When the total amount of the functional component (A) and the ceramics component (C) is too small, the desired functionalities such as deodorizing properties, antimicrobial properties, physiological activity, and antioxidation properties are not enough exhibited. On the other hand, when the total amount of the functional component (A) and the ceramics component (C) is too large, negative features become conspicuous so that not only the functionalities do not increase exceeding a certain extent, but also the productivity of the composite molding having a shape of filament or film is lowered, and the strength and drape are decreased.

With respect to the relation between the functional component (A) and the ceramics component (C), it is desired that an amount of the functional component (A) is from 1 to 300 parts by weight (preferably from 2 to 200 parts by weight, and more preferably from 3 to 150 parts by weight) based on 100 parts by weight of the ceramics component (C). When the amount of the functional component (A) is too small, the desired functionalities such as deodorizing properties, antimicrobial properties, physiological activity, and antioxidation properties are not sufficient. On the other hand, when the amount of the functional component (A) is too large, a balance to the ceramics component (C) is lost, leading to a disadvantage from the standpoint of cost.

(Joining Type)

The composite molding according to the present invention is a joining type composite molding having structure of the internal component X and the external component Y. In this connection, examples of the joining type include a core-sheath type and a bimetal (side-by-side) joining type. In the case of the core-sheath joining type, the internal component X is a core component, and the external component Y is a sheath component. The structure here may be any of concentric core-sheath type, eccentric core-sheath type, polycentric core-sheath type, and hollow core-sheath type. In the case of the core-sheath type, even when the adhesion between the first resin (H) as the internal component X and the second resin (L) used for the external component Y is insufficient, it is possible to ensure the adhesion between the internal and external layers through choosing, as the second resin (L), a material having a degree of shrinkage larger than that of the first resin (H). In the case of the bimetal joining type, the type is in a Y/X or Y/X/Y state (in the Y/X state, one is made of the internal component X, wherein the other is made of the external component Y).

(Proportion of the Internal Component X to the External Component Y)

When the composite molding is of a core-sheath joining type, a suitable weight ratio of the internal component X as the core component to the external component Y as the sheath component is from 30:70 to 80:20, and particularly from 35:65 to 75:25. When the proportion of the sheath component is too small, since the proportion of the functional component (A) is too small, the desired functionalities are not thoroughly exhibited. Further, when the resulting molding is required to have heat adhesion, the heat adhesion becomes insufficient. On the other hand, when the proportion of the sheath component is too large, since the proportion of the core component X is relatively too small, the resulting molding is liable to be not satisfied from the standpoints of moldability (e.g., spinning properties, etc.), stretching properties, strength, dimensional stability, etc.

When the composite molding is of a bimetal joining type, a suitable weight ratio of the internal component X to the external component Y (in the Y1×1Y state, weight ratio of X to other Y is from 30:70 to 95:5, and particularly from 35:65 to 90:10. Namely, the proportion of the internal component X can be made larger, as compared with the case of the core-sheath joining type.

(Shape of Composite Molding)

When the composite molding is of a core-sheath joining type, a representative shape is in a filament state. Its cross-section can be made not only circular but non-circular. It can also be made hollow as the case may be. A thickness of the filament is arbitrary in from an extra fine fibrous state to a monofilament state (from an extra fine denier to an extra thick denier), or even up to a state close to a thicker rod.

When the composite molding is of a bimetal joining type, a representative shape is in a film or sheet state. The molding may be slit into thin strips to form filaments. Further, the film or sheet can also be split. In addition, the molding can be formed into a container state, a plate state, or other state of various parts.

(Production of Composite Molding)

When the first resin (H) and the second resin (L) are a resin falling within a scope different from each other, or a resin falling within the same scope of a non-polyolefinic resin, the composite molding can be suitably produced in the following manner.

Namely, the first resin (H) and the second resin (L) compounded with the functional component (A), which is at least one member selected from the group consisting of catechin, saponin, tea-leaf powder, tea-leaf extract, and tannin (tannic acid), and the ceramics component (C) are subjected to co-extrusion forming at a temperature higher than melting temperatures of the respective components, such that the first resin (H) becomes the internal component X and that the second resin (L) compounded with the functional component (A) and the ceramics component (C) becomes the external component Y. There can be thus obtained a joining type composite molding constructed of the internal component X and the external component Y. In this case, the functional component (A) can also be internally added to the first resin (H) that becomes the internal component X.

The co-extrusion forming can be attained by discharging the first resin (H) and the second resin (L) linear or sheet-like form from composite dies using two or more extruders. Depending on circumstances, the both resins are formed into a net-like form by using rotating dies. In this connection, the second resin (L), a master batch in which the concentration of the material to be internally added is high may be previously prepared and then mixed with the second resin (L), followed by providing for the forming.

If desired, in both the first resin (H) and the second resin (L), auxiliary agents such as antioxidants, ultraviolet light absorbers, colorants, lubricants, antistatic agents, matting agents, fluidity improvers, plasticizers, and flame retardants can be internally added. In particular, it is preferred that, in the second resin (L) compounded with the functional component (A) and the ceramics component (C), forming aids effective for improving the flocculation prevention or the dispersibility, inclusive of metallic soaps, are compounded together with stabilizers such as antioxidants, thereby ensuring homogenous dispersion of the functional component (A) and the ceramics component (C) (particularly, composite particles comprising the both). Further, in order to improve supporting properties of the functional component (A), suitable amounts of metal ion sources such as copper salts, iron salts, calcium salts, titanium salts, aluminum salts, silver salts, tin salts, zinc salts, chromium salts, and cobalt salts can be made coexistent.

In the case where a filament-form material is obtained in many cases drawing is carried out after the co-extrusion forming. While the drawing ratio is not particularly limited, when the drawing ratio is too small, the strength tends to be insufficient depending on the use. The drawing ratio is usually 3 or more, and particularly 4 or more. On the other hand, when the drawing ratio is too large, a trouble in which ply separation is likely to occur between the core and the sheath may be caused. Accordingly, an upper limit of the drawing ratio is generally about 10. Further, since the drawing is not required depending on the use, the drawing is not always essential. When a film-form or sheet-form material is to be obtained, drawing may also be carried out after co-extrusion forming, if desired.

(Application and Use)

When the composite molding according to the present invention is in a filament form, it is free to obtain from the composite filament secondary products such as yarns, piles, cotton-like materials, nets, ropes, belts, woven fabrics, non-woven fabrics, and knitted fabrics. The composite filament or secondary products thereof can be used in combination with fibers or monofilaments such as natural fibers (cotton, hemp, silk, wool, etc.), fibers or monofilaments of synthetic resins (polyesters, acrylic reins, polypropylene, polyethylene, nylons, vinylons, polyvinylidene chloride, polyvinyl chloride, polyurethane, etc.), semi-synthetic fibers (acetate fibers, etc.), regenerated fibers (rayon, etc.), and inorganic fibers (glass fibers, carbon fibers, etc.), or secondary products thereof. When the composite molding according to the present invention is film, sheet, or container, the secondary products can also be obtained by lamination or the like.

Examples of the use for which the composite molding or its secondary products according to the present invention is applied include interior materials of vehicles (sheet cloths, ceiling materials, flooring materials, etc.), interior materials for rooms (wall sheets, flooring materials, etc.), matting materials of rooms or vehicles (mats, carpets, etc.), filters (for air conditioners, air cleaners, vacuum cleaners, etc.), footwear materials, industrial materials, clothing materials, bedding materials, hygienic materials, medical materials, daily goods, kitchen utensils, toiletry, and packaging materials.

(Heat Fused Article)

When the kind of the second resin (L) is chosen, or the amount of the internally added material is regulated in order to impart heat fusion properties to the external component Y of the composite molding according to the present invention, heat fused articles can be obtained. For example, when textile fabrics (e.g., nets, woven fabrics, knitted fabrics, etc.) or non-woven fabrics are produced using composite filaments of a core-sheath joining type, or filaments obtained by slitting a film of a bimetal joining type into thin strips, crossover points of the filaments can be fused upon heat fusion. Accordingly, an advantage is given that mesh deviation occurred during the practical use or secondary processing can be effectively prevented. Alternatively, the textile fabrics or non-woven fabrics can be fixed to a frame or the like.

The present invention is further described below with reference to the following Examples. In these Examples, all parts and percents are on a weight basis.

(Preparation of Materials)

As the first resin (H) was prepared the following materials.

($H_1$): Polypropylene (PP) having a melting point of 163° C. and a specific gravity of 0.91

As the second resin (L) was prepared the following materials.

($L_1$): Polyethylene terephthalate (PET) having a melting point of 265° C. and a specific gravity of 1.4

As the functional component (A) to be internally added to the second resin (L) were prepared the following materials.

($A_1$): 30% Product of tea catechin (a tea catechin formulation originated from tea, containing about 30% in total of epigallocatechin, epigallocatechin gallate, epicatechin and epicatechin gallate)

($A_2$): Tea saponin having a purity of 70%

($A_3$): Green tea powder ($A_4$) Powder obtained by drying a hot water-extract of green tea ($A_5$): Tannic acid having a purity of 85%

As a raw material of the ceramics component (C) to be internally added to the second resin (L) were prepared the following materials.

($C_1$): Silicate (water glass)

($C_2$): Aluminum phosphate and colloidal silica ($C_3$): Silica, aluminum phosphate and colloidal silica (Preparation of Functional Component (A)-Ceramics Component (C) Composite Particles)

Composite particles comprising the functional component (A) and the ceramics component (C) were produced in the following manners.

(Method 1)

The raw material ($C_1$) for the ceramics component (C) was prepared in the following manner. That is, the functional material (A) was added to a 1N sulfuric acid solution kept at 0° C., and a 1N water glass solution was separately prepared. Next, the 1N water glass solution was added dropwise over several minutes while vigorously stirring the 1N sulfuric acid solution containing the functional component (A). At this time, the reaction mixture had a temperature of from 5 to 7° C. The mixed solution was washed with running water for one day, and then, the water was well drained off. Thereafter, the residue was finely ground and dried in vacuo in a dryer at a temperature of 50 to 60° C., to obtain a powdered composite.

(Method 2)

The raw material ($C_2$) for the ceramics component (C) was prepared in the following manner. That is, the functional material (A) was mixed with 200 parts of an aluminum phosphate aqueous solution having a concentration of 25% to adjust pH at from 3 to 4, and the mixture was further mixed with 130 parts of a colloid solution of colloidal silica (solids content: 40%) to make the pH neutral. Since a slurry had gradually flocculated, it was placed on an evaporating dish (or in a crucible) within a period in which it could be handled and subjected to a heat treatment by drying at from 100 to 300° C. in a constant-temperature dryer or an electric furnace. A rigid, amorphous flocculation product was thus obtained. The obtained flocculation product was finely ground in an automatic mortar (or a ball mill) and screened by a sieve to obtain particles having a particle size of from 100 to 325 mesh. The particles of the flocculation product were then subjected to a heat treatment in a constant-temperature dryer or an electric furnace.

(Method 3)

The raw material ($C_3$) for the ceramics component (C) was prepared in the following manner. That is, 130 parts of the functional component (A) was dry mixed with 400 parts by weight of silica having a mean particle size smaller than 325 mesh, and 200 parts of an aluminum phosphate aqueous solution having a concentration of 25% was added to and kneaded with the mixture to a degree of an approximately stiff paste. The paste was further mixed with 50 parts of a colloid solution of colloidal silica (solid content: 40%) to make the pH neutral. Since flocculation occurred step by step at this time, the mixture was placed on an evaporating dish within a period in which it could be handled and then dried. Thereafter, the dried product was subjected to dehydration and hydrolysis at from 100 to 300° C. and then finely ground.

EXAMPLES 1 TO 7

The second resin (L) was mixed with the functional component (A)-supported ceramics component (C) obtained in Method 1, 2 or 3 as described above, together with small amounts of an antioxidant and a flocculation preventive (a dispersing agent), and the mixture was melt extruded and pelletized. The thus obtained pellets were used as the external component (sheath component) Y, and pellets of the above-described first resin (H) were used as the internal component (core component) X. The both pellets were subjected to co-extrusion under temperature conditions of 70 to 90° C. higher than the melting point of the second resin (L) with respect to the external component (sheath component) Y and under temperature conditions of 60 to 90° C. higher than the melting point of the first resin (H) with respect to the internal component (core component) X, respectively, from two extruders each equipped with a composite die, followed by drawing in a drawing ratio of about 6, thereby obtaining a composite filament (composite molding). Thereafter, from this composite filament was prepared a non-woven fabric. The conditions are shown in Table 1.

COMPARATIVE EXAMPLES 1 AND 2

To the second resin (L) was internally added the functional component (A) and subjected to extrusion forming at a temperature of 70 to 90° C. higher than the melting point of the second resin (L), followed by drawing in a drawing ratio of about 6, thereby obtaining a filament. Using the thus obtained filament, a non-woven fabric was prepared. The conditions are also shown in Table 1.

COMPARATIVE EXAMPLES 3 AND 4

The same procedures as in Examples 1 to 7 were followed to effect co-extrusion, except omitting the internal addition of the ceramics component (C) to the second resin (L), followed by drawing in a drawing ratio of about 6, thereby obtaining a filament (composite filament). Using the thus obtained filament, a non-woven fabric was prepared. The conditions are also shown in Table 1.

FIG. 1A is a schematically cross-sectional view of the composite molding (composite filament) obtained in Example 1; and FIG. 1B is a schematically cross-sectional view of the monofilament obtained in Comparative Example 1.

TABLE 1

| | Internal component X | | External component Y | | | Composite particles |
|---|---|---|---|---|---|---|
| | (H) | (A) | (L) | (A) | (C) | |
| Comparative Example 1 | (See Note 1) | | ($L_1$):94 parts | ($A_1$):6 parts | — | — |
| Comparative Example 2 | (See Note 1) | | ($L_1$):94 parts | ($A_2$):6 parts | — | — |
| Comparative Example 3 | ($H_1$):50 parts | — | ($L_1$):46 parts - | ($A_1$):3 parts | — | — |
| Comparative Example 4 | ($H_1$):50 parts | — | ($L_1$):46 parts - | ($A_2$):3 parts | — | — |
| Example 1 | ($H_1$):50 parts | — | ($L_1$):35 parts | ($A_1$):3 parts | ($C_1$):12 parts | Method 1 |
| Example 2 | ($H_1$):50 parts | — | ($L_1$):35 parts | ($A_2$):3 parts | ($C_1$):12 parts | Method 1 |
| Example 3 | ($H_1$):50 parts | — | ($L_1$):35 parts | ($A_3$):3 parts | ($C_1$):12 parts | Method 1 |
| Example 4 | ($H_1$):50 parts | — | ($L_1$):35 parts | ($A_1$):3 parts | ($C_2$):12 parts | Method 2 |
| Example 5 | ($H_1$):50 parts | — | ($L_1$):35 parts | ($A_4$):3 parts | ($C_2$):12 parts | Method 2 |

TABLE 1-continued

|  | Internal component X | | External component Y | | | Composite particles |
|---|---|---|---|---|---|---|
|  | (H) | (A) | (L) | (A) | (C) |  |
| Example 6 | (H₁):50 parts | — | (L₁):35 parts | (A₅):3 parts | (C₃):12 parts | Method 3 |
| Example 7 | (H₁):50 parts | — | (L₁):35 parts | (A₁):3 parts | (C₃):12 parts | Method 3 |

Note 1: In Comparative Examples 1 and 2, monofilament (non-composite filament)
Note 2: In Comparative Examples 3 and 4 and Examples 1 to 7, core-sheath joining type composite filament (Test)

Each of the non-woven fabrics as prepared above was dipped in water at a normal temperature for 3 hours and then once taken out, followed by spontaneous drying. Thereafter, the filter was again dipped in water for 3 hours and then taken out, followed by spontaneous drying. The amounts of the functional component (A) before the first dipping in water and after the second dipping in water were measured by thermal analysis by means of a differential calorimeter (the temperature was elevated at a rate of 5° C./min in an electric furnace, and a heat balance (endothermic heat/exothermic heat) of the sample during the heating step and an accompanying increase or decrease in weight were analyzed). And, the filters before and after the water washing were subjected to a deodorizing properties test and an antimicrobial properties test under the following conditions. The results obtained are shown separately in Tables 2 and 3.

(Deodorizing Properties Test)

In a 1-m³ vessel was placed an air cleaner having each of the non-woven fabrics as described above equipped therein, which could be operated externally, and five cigarettes were installed in a smoke absorber and ignited in the vessel. When the first cigarette had burnt out, the operation of the air cleaner was started. An ammonia concentration was measured by using a gas detector tuber 5 minutes and 30 minutes after the start of the operation. Then, a deodorizing rate was determined by the decreased amount of concentration after 30 minutes, as compared with the concentration (initial concentration) after 5 minutes.

(Antimicrobial Properties Test)

Each of the samples was examined for the antimicrobial properties under the following conditions.
Test item: Test for rate of decrease in number of bacteria
Test bacterium: *Staphyloccus aureus* ATCC 6538P
Test method: According to a uniform test method
Test results:
Number of planted bacteria (A):

$$1.0 \times 10^5 \ \log A = 5.0$$

Number of bacteria on non-processed cloth (B):

$$1.6 \times 10^7 \ \log B = 7.2$$

(A Standard Cotton Cloth was Used as the Non-Processed Cloth.)

log B–log A=2.2>1.5 (the test was effective) Increase or decrease value=log C–Log A Difference in increase or decrease value=(log B–log A)–(log C–log A)

TABLE 2

|  | Comparative Example | | | |
|---|---|---|---|---|
|  | 1 | 2 | 3 | 4 |
| Before water washing |  |  |  |  |
| Content of (A) (%) | 3.9 | 3.9 | 2.1 | 2.0 |
| After dipping in water |  |  |  |  |
| Content of (A) (%) | 0.6 | 0.7 | 0.2 | 0.2 |
| Deodorizing rate of NH₃ (%) | 51 | 52 | 46 | 45 |
| Antimicrobial properties |  |  |  |  |
| Number of bacteria, log C | 6.5 | 6.5 | 6.9 | 6.9 |
| Increase or decrease value | 1.5 | 1.5 | 1.9 | 1.9 |
| Difference in increase or decrease value | 0.7 | 0.7 | 0.3 | 0.3 |

(For the Antimicrobial Properties Test, 0.2 g of the Sample was Collected.)

TABLE 3

|  | Example | | | | | | |
|---|---|---|---|---|---|---|---|
|  | 1 | 2 | 3 | 4 | 5 | 6 | 7 |
| Before water washing |  |  |  |  |  |  |  |
| Content of (A) (%) | 2.7 | 2.7 | 2.6 | 2.6 | 2.7 | 2.6 | 2.6 |
| After dipping in water |  |  |  |  |  |  |  |
| Content of (A) (%) | 2.6 | 2.6 | 2.5 | 2.5 | 2.5 | 2.5 | 2.4 |
| Deodorizing rate of NH₃ (%) | 75 | 75 | 73 | 73 | 74 | 72 | 72 |
| Antimicrobial properties |  |  |  |  |  |  |  |
| Number of bacteria, log C | 3.8 | 3.9 | 3.9 | 3.9 | 4.0 | 4.2 | 3.9 |
| Increase or decrease value | −1.2 | −1.1 | −1.1 | −1.1 | −1.0 | −1.2 | −1.1 |
| Difference in increase or decrease value | 3.4 | 3.3 | 3.3 | 3.3 | 3.2 | 3.0 | 3.3 |

(For the Antimicrobial Properties Test, 0.2 g of the Sample was Collected.)

It is understood from Tables 2 and 3 that, in Comparative Examples 1 and 2, even though the internal addition amount of the functional component (A) is 6 parts, the functionalities after dipping in water are insufficient. Further, it is understood that, in Comparative Examples 3 and 4, since the functional component (A) is internally added in the side of the sheath component Y as the external layer, the functionalities after dipping in water are more insufficient. Further, when drawn articles of a filament made of the second resin (L₁) only, in which the functional component (A) is not internally added, the deodorizing rate of NH₃ is about 40%, and hence, a "(measured value)—40%" value is a substantial deodorizing rate. Further, it is understood that, in Comparative Examples 3 and 4, since the ceramics component (C) is not co-existent, a considerable amount of the functional component (A) was volatilized out during the extrusion forming, as compared with Examples 1 to 7. Moreover, in Examples 1 to 7, since PP having a low specific gravity is used for the core, and PET is used for the sheath acting as a surface, there are merits that the surface can have preferable drape, nerve, feeling (challis-like feeling), heat resistance, and shrinkage resistance during laundry, which PET possesses, while preventing an increase of the specific gravity of the whole.

(Antiviral Properties Test)

Using each of the composite filaments obtained in Examples 1, 4 and 7 and of a composite filament (control) composed of the first resin ($H_1$) and the second resin ($L_1$) in a weight ratio of 1:1, a specimen (3 cm×3 cm) comprising a filter for air conditioner was prepared. To the specimen was added by dropping 0.2 ml of an influenza virus-floating solution, followed by storing at 25° C. Twenty-four hours after the storage, the virus on the specimen was washed away, and a logarithmic value of a virus infection value (a 50% tissue culture infectious dose ($TCID_{50}$) per ml) was measured. The results obtained are shown in Table 4.

TABLE 4

| | log $TCID_{50}$/ml | |
|---|---|---|
| | At the start | After 24 hours |
| Control | 5.3 | 5.3 |
| Example 1 | 5.3 | 3.4 |
| Example 4 | 5.3 | 3.4 |
| Example 7 | 5.3 | 3.4 |

(Preparation of Materials)

As the first resin (H) were prepared the following materials.

($H_1$): Polypropylene (PP) having a melting point of 163° C. and a specific gravity of 0.91

($H_2$): Nylon 6 (Ny6) having a melting point of 220° C. and a specific gravity of 1.13

($H_3$): Polyethylene terephthalate (PET) having a melting point of 265° C. and a specific gravity of 1.4

As the second resin (L), were prepared the following materials.

($L_1$): Polyethylene terephthalate (PET) having a melting point of 265° C. and a specific gravity of 1.4

($L_2$): Polypropylene (PP) having a melting point of 128° C. and a specific gravity of 0.91

($L_3$) Nylon 6 (Ny6) having a melting point of 220° C. and a specific gravity of 1.13

As the functional component (A) to be internally added to the second resin (L) was prepared the following material.

($A_1$): 30% Product of tea catechin (a tea catechin formulation originated from tea, containing about 30% in total of epigallocatechin, epigallocatechin gallate, epicatechin and epicatechin gallate)

As a raw material of the ceramics component (C) to be internally added to the second resin (L), were prepared the following materials.

($C_3$): Silica, aluminum phosphate and colloidal silica ($C_4$): Sepiolite (Preparation of Functional Component (A)-Ceramics Component (C))

As to ($C_3$), composite particles with ($A_1$) were produced according to Method 3 as described above. Further, as to ($C_4$), ($A_1$) was dissolved or dispersed in water, into which was then addede ($C_4$), followed by mixing and drying (referred to as "Method 4", hereinafter).

EXAMPLES 8 TO 11

The second resin (L) was mixed with the functional component (A)-supported ceramics component (C) obtained in Method 3 or 4 as described above, together with small amounts of an antioxidant and a flocculation preventive (a dispersing agent), and the mixture was melt extruded and pelletized. The thus obtained pellets were used as the external component (sheath component) Y, and pellets of the above-described first resin (H) were used as the internal component (core component) X. The both pellets were subjected to co-extrusion under temperature conditions of 70 to 90° C. higher than the melting point of the second resin (L) with respect to the external component (sheath component) Y and under temperature conditions of 60 to 90° C. higher than the melting point of the first resin (H) with respect to the internal component (core component) X, respectively, from two extruders each equipped with a composite die, followed by drawing in a drawing ratio of about 6, thereby obtaining a composite filament (composite molding). Thereafter, from this composite filament, was prepared a non-woven fabric. The conditions are shown in Table 5.

COMPARATIVE EXAMPLES 5 TO 7

To the second resin (L), was internally added the functional component (A) and subjected to extrusion forming at a temperature of 70 to 90° C. higher than the melting point of the second resin (L), followed by drawing in a drawing ratio of about 6, thereby obtaining a filament. Using the thus obtained filament, a non-woven fabric was prepared. The conditions are also shown in Table 5.

COMPARATIVE EXAMPLES 8 TO 11

The same procedures as in Examples 8 to 11 were followed to effect co-extrusion, except omitting the internal addition of the ceramics component (C) to the second resin (L), followed by drawing in a drawing ratio of about 6, thereby obtaining a filament (composite filament). Using the thus obtained filament, a non-woven fabric was prepared. The conditions are also shown in Table 5.

TABLE 5

| | Internal component X | | External component Y | | | Composite particles |
|---|---|---|---|---|---|---|
| | (H) | (A) | (L) | (A) | (C) | |
| Comparative Example 5 | (See Note 1) | | ($L_1$):94 parts | ($A_1$):6 parts | — | — |
| Comparative Example 6 | (See Note 1) | | ($L_2$):94 parts | ($A_1$):6 parts | — | — |
| Comparative Example 7 | (See Note 1) | | ($L_3$):94 parts | ($A_1$):6 parts | — | — |
| Comparative Example 8 | ($H_1$):50 parts | — | ($L_3$):46 parts - | ($A_1$):3 parts | — | — |
| Comparative Example 9 | ($H_2$):50 parts | — | ($L_1$):46 parts - | ($A_1$):3 parts | — | — |
| Comparative Example 10 | ($H_3$):50 parts | — | ($L_2$):46 parts - | ($A_1$):3 parts | — | — |
| Comparative Example 11 | ($H_3$):50 parts | — | ($L_3$):46 parts - | ($A_1$):3 parts | — | — |
| Example 8 | ($H_1$):50 parts | — | ($L_3$):35 parts | ($A_1$):3 parts | ($C_3$):12 parts | Method 3 |
| Example 9 | ($H_2$):50 parts | — | ($L_1$):35 parts | ($A_1$):3 parts | ($C_4$):12 parts | Method 3 |
| Example 10 | ($H_3$):50 parts | — | ($L_2$):35 parts | ($A_1$):3 parts | ($C_4$):12 parts | Method 4 |
| Example 11 | ($H_3$):50 parts | — | ($L_3$):35 parts | ($A_1$):3 parts | ($C_4$):12 parts | Method 4 |

Note 1: In Comparative Examples 1 to 3, monofilament (non-composite filament)
Note 2: In Comparative Examples 8 to 11 and Examples 8 to 11, core-sheath joining type composite filament (Test)

The same tests as in Examples 1 to 7 were carried out. The results obtained are shown in Tables 6 and 7.

TABLE 6

| | Comparative Example | | | | | | |
|---|---|---|---|---|---|---|---|
| | 5 | 6 | 7 | 8 | 9 | 10 | 11 |
| Before water washing | | | | | | | |
| Content of (A) (%) | 3.8 | 4.0 | 4.0 | 2.2 | 2.0 | 2.2 | 2.2 |
| After dipping in water | | | | | | | |
| Content of (A) (%) | 0.6 | 0.8 | 0.5 | 0.2 | 0.2 | 0.2 | 0.1 |
| Deodorizing rate of $NH_3$ (%) | 50 | 54 | 48 | 44 | 44 | 45 | 40 |
| Antimicrobial properties | | | | | | | |
| Number of bacteria, log C | 6.6 | 6.6 | 6.6 | 6.9 | 7.0 | 6.9 | 7.1 |
| Increase or decrease value | 1.6 | 1.6 | 1.6 | 1.9 | 2.0 | 1.9 | 2.2 |
| Difference in increase or Decrease value | 0.6 | 0.6 | 0.6 | 0.3 | 0.2 | 0.3 | 0.1 |

(For the Antimicrobial Properties Test, 0.2 g of the Sample was Collected.)

TABLE 7

| | Example | | | |
|---|---|---|---|---|
| | 8 | 9 | 10 | 11 |
| Before water washing | | | | |
| Content of (A) (%) | 2.6 | 2.4 | 2.6 | 2.7 |
| After dipping in water | | | | |
| Content of (A) (%) | 2.5 | 2.3 | 2.2 | 2.3 |
| Deodorizing rate of $NH_3$ (%) | 74 | 70 | 70 | 69 |
| Antimicrobial properties | | | | |
| Number of bacteria, log C | 3.9 | 4.1 | 4.1 | 4.1 |
| Increase or decrease value | −1.1 | −0.9 | −0.9 | −0.9 |
| Difference in increase or decrease value | 3.3 | 3.1 | 3.1 | 3.1 |

(For the Antimicrobial Properties Test, 0.2 g of the Sample was Collected.)

EXAMPLE 12

As raw materials of the first resin (H), the second resin (L), the functional component (A) to be internally added to the second resin (L), and the ceramics component (C) to be internally added to the second resin (L), were prepared the following materials. Further, composite particles comprising the functional component (A) having the ceramics component (C) supported thereon were obtained in the same procedures as in Method 1 as described above.

($H_1$): Polypropylene (PP) having a melting point of 163° C. and a specific gravity of 0.91

($L_1$): Polyethylene terephthalate (PET) having a melting point of 265° C. and a specific gravity of 1.4

($A_1$): 30% Product of tea catechin ($C_1$): Silicate (water glass)

The second resin (L) was mixed with the functional component (A)-supported ceramics component (C) obtained in Method 1 as described above, together with small amounts of an antioxidant and a flocculation preventive (a dispersing agent), and the mixture was melt extruded and pelletized. The thus obtained pellets were used as the external component (sheath component) Y, and pellets of the above-described first resin (H) were used as the internal component (core component) X. The both pellets were subjected to co-extrusion under temperature conditions of about 80° C. higher than the melting point of the second resin (L) with respect to the external component (sheath component) Y and under temperature conditions of about 80° C. higher than the melting point of the first resin (H) with respect to the internal component (core component) X, respectively, from two extruders each equipped with a composite die, thereby obtaining a bimetal joining type film-like composite molding of a Y/X/Y layer construction. Thereafter, the resulting film-like composite molding was slit into thin strips. Using the thus obtained fibrous molding, a cloth was prepared. This cloth had deodorizing properties and antimicrobial properties as in Example 1.

(Preparation of Materials)

As the first resin (H) and the second resin (L), were prepared the following materials. ($H_3$) is the same resin as ($L_1$)

($H_3$): Polyethylene terephthalate (PET) having a melting point of 265° C.

($L_1$): Polyethylene terephthalate (PET) having a melting point of 265° C.

EXAMPLES 13 TO 19

The second resin (L) of the external component Y was mixed with the functional component (A)-supported ceramics component (C) obtained in Method 1, 2 or 3 as described above, together with small amounts of an antioxidant and a flocculation preventive (a dispersing agent), and the mixture was melt extruded and pelletized. The thus obtained pellets were used as the external component (sheath component) Y, and pellets of the above-described first resin (H) were used as the internal component (core component) X. The both pellets were subjected to co-extrusion under temperature conditions of 70 to 90° C. higher than the melting point of the resin (L) of the external component Y with respect to the external component (sheath component) Y and under temperature conditions of 70 to 90° C. higher than the melting point of the resin (H) of the internal component X with respect to the internal component (core component) X, respectively, from two extruders each equipped with a composite die, followed by drawing as far as possible, thereby obtaining a composite filament (composite molding). Thereafter, from this composite filament was prepared a non-woven fabric. The conditions are shown in Table 8.

COMPARATIVE EXAMPLES 12 AND 13

To the same resin as the resin (L) of the external component Y, was internally added the functional component (A) and subjected to extrusion forming at a temperature of 70 to 90° C. higher than the melting point of that resin, followed by drawing as far as possible, thereby obtaining a filament. Using the thus obtained filament, a non-woven fabric was prepared. The conditions are also shown in Table 8.

COMPARATIVE EXAMPLES 14 AND 15

The same procedures as in Examples 13 to 19 were followed to effect co-extrusion, except omitting the internal addition of the ceramics component (C) to the second resin (L) of the external component Y, followed by drawing as far as possible, thereby obtaining a filament (composite filament). Using the thus obtained filament, a non-woven fabric was prepared. The conditions are also shown in Table 8.

TABLE 8

| | Internal component X | | External component Y | | | Composite particles |
|---|---|---|---|---|---|---|
| | (H) | (A) | (L) | (A) | (C) | |
| Comparative Example 12 | (See Note 1) | | (L$_1$):94 parts | (A$_1$):6 parts | — | — |
| Comparative Example 13 | (See Note 1) | | (L$_1$):94 parts | (A$_2$):6 parts | — | — |
| Comparative Example 14 | (H$_3$):50 parts | — | (L$_1$):46 parts - | (A$_1$):3 parts | — | — |
| Comparative Example 15 | (H$_3$):50 parts | — | (L$_1$):46 parts - | (A$_2$):3 parts | — | — |
| Example 13 | (H$_3$):50 parts | — | (L$_1$):35 parts | (A$_1$):3 parts | (C$_1$):12 parts | Method 1 |
| Example 14 | (H$_3$):50 parts | — | (L$_1$):35 parts | (A$_2$):3 parts | (C$_1$):12 parts | Method 1 |
| Example 15 | (H$_3$):50 parts | — | (L$_1$):35 parts | (A$_3$):3 parts | (C$_1$):12 parts | Method 1 |
| Example 16 | (H$_3$):50 parts | — | (L$_1$):35 parts | (A$_1$):3 parts | (C$_2$):12 parts | Method 2 |
| Example 17 | (H$_3$):50 parts | — | (L$_1$):35 parts | (A$_4$):3 parts | (C$_2$):12 parts | Method 2 |
| Example 18 | (H$_3$):50 parts | — | (L$_1$):35 parts | (A$_5$):3 parts | (C$_3$):12 parts | Method 3 |
| Example 19 | (H$_3$):50 parts | — | (L$_1$):35 parts | (A$_1$):3 parts | (C$_3$):12 parts | Method 3 |

Note 1: In Comparative Examples 12 and 13, monofilament (non-composite filament)
Note 2: In Comparative Examples 14 and 15 and Examples 13 to 19, core-sheath joining type composite filament (Test)

Using the non-woven fabrics as prepared above, various tests were carried out in the same procedures as described above. The results obtained are shown separately in Tables 9 and 10.

TABLE 9

| | Comparative Example | | | |
|---|---|---|---|---|
| | 12 | 13 | 14 | 15 |
| Before water washing | | | | |
| Content of (A) (%) | 3.8 | 3.8 | 2.0 | 2.0 |
| After dipping in water | | | | |
| Content of (A) (%) | 0.6 | 0.6 | 0.2 | 0.2 |
| Deodorizing rate of NH$_3$ (%) | 50 | 49 | 44 | 40 |
| Antimicrobial properties | | | | |
| Number of bacteria, log C | 6.6 | 6.6 | 7.0 | 6.9 |
| Increase or decrease value | 1.6 | 1.6 | 2.0 | 1.9 |
| Difference in increase or decrease value | 0.6 | 0.6 | 0.2 | 0.3 |

(For the Antimicrobial Properties Test, 0.2 g of the Sample was Collected.)

TABLE 10

| | Example | | | | | | |
|---|---|---|---|---|---|---|---|
| | 13 | 14 | 15 | 16 | 17 | 18 | 19 |
| Before water washing | | | | | | | |
| Content of (A) (%) | 2.6 | 2.6 | 2.5 | 2.5 | 2.6 | 2.5 | 2.5 |
| After dipping in water | | | | | | | |
| Content of (A) (%) | 2.4 | 2.4 | 2.3 | 2.3 | 2.5 | 2.2 | 2.3 |
| Deodorizing rate of NH$_3$ (%) | 73 | 73 | 72 | 71 | 73 | 70 | 71 |
| Antimicrobial properties | | | | | | | |
| Number of bacteria, log C | 3.8 | 3.9 | 4.1 | 4.0 | 4.0 | 4.2 | 4.0 |
| Increase or decrease value | −1.2 | −1.1 | −0.9 | −1.0 | −1.0 | −0.8 | −1.0 |
| Difference in increase or decrease value | 3.4 | 3.3 | 3.1 | 3.2 | 3.2 | 3.0 | 3.2 |

(For the Antimicrobial Properties Test, 0.2 g of the Sample was Collected.)

It is understood from Tables 9 and 10 that, in Comparative Examples 12 and 13, even though the internal addition amount of the functional component (A) is 6 parts, the functionalities after dipping in water are insufficient. Further, it is understood that, in Comparative Examples 14 and 15, since the functional component (A) is internally added in the side of the sheath component Y as the external layer, the functionalities after dipping in water are more insufficient. Further, when drawn articles of a filament made of the second resin (L) only, in which the functional component (A) is not internally added, the deodorizing rate of NH$_3$ is about 40%, and hence, a "(measured value)—40%" value is a substantial deodorizing rate. Further, it is understood that, in Comparative Examples 14 and 15, since the ceramics component (C) is not co-existent, a considerable amount of the functional component (A) was volatilized out during the extrusion forming, as compared with Examples 13 to 19. Moreover, in Examples 13 to 19, since PET is used for the core (for the sheath, too), there are obtained preferable drape, nerve, feeling (challis-like feeling) heat resistance, and shrinkage resistance during laundry.

(Preparation of Materials)

As the first resin (H) and the second resin (L), were prepared the following materials. (H$_2$) is the same resin as (L$_3$); (H$_4$) is the same resin as (L$_4$); and (H$_5$) is the same resin as (L$_5$), respectively.

(H$_2$): Nylon 6 (Ny6) having a melting point of 220° C.
(H$_4$): Nylon 66 (Ny66) having a melting point of 260° C.
(H$_5$): Polyvinylidene chloride (a copolymer containing 15% of vinyl chloride) having a melting point of 175° C.
(L$_3$): Nylon 6 (Ny6) having a melting point of 220° C.
(L$_4$) Nylon 66 (Ny66) having a melting point of 260° C.
(L$_5$): Polyvinylidene chloride (a copolymer containing 15% of vinyl chloride) having a melting point of 175° C.

As the functional component (A) to be internally added in the resin (L) of the external component Y, was prepared the following material.

(A$_1$): 30% Product of tea catechin (a tea catechin formulation originated from tea, containing about 30% in total of epigallocatechin, epigallocatechin gallate, epicatechin and epicatechin gallate)

As a raw material of the ceramics component (C) to be internally added in the resin (L) of the external component Y, were prepared the following materials.

(C$_3$): Silica, aluminum phosphate and colloidal silica
(C$_4$): Sepiolite (Preparation of Functional Component (A)-Ceramics Component (C))

As to (C$_3$), composite particles with (A$_1$) were produced according to Method 3 as described above. Further, as to (C$_4$), (A$_1$) was dissolved or dispersed in water, into which was then added ($C_4$), followed by mixing and drying (referred to as "Method 4", hereinafter).

EXAMPLES 20 TO 23

The second resin (L) of the external component Y was mixed with the functional component (A)-supported ceramics component (C) obtained in Method 3 or 4 as described above, together with small amounts of an antioxidant and a flocculation preventive (a dispersing agent), and the mixture was melt extruded and pelletized. The thus obtained pellets were used as the external component (sheath component) Y, and pellets of the above-described first resin (H) were used as the internal component (core component) X. The both pellets were subjected to co-extrusion under temperature conditions of 70 to 90° C. higher than the melting point of the resin (L) of the external component Y with respect to the external component (sheath component) Y and under temperature conditions of 70 to 90° C. higher than the melting point of the resin (H) of the internal component X with respect to the internal component (core component) X, respectively, from two extruders each equipped with a composite die, followed by drawing as far as possible, thereby obtaining a composite filament (composite molding). Thereafter, from this composite filament, was prepared a non-woven fabric. The conditions are shown in Table 11.

COMPARATIVE EXAMPLES 16 TO 18

To the resin same as the resin (L) of the external component Y, was internally added the functional component (A) and subjected to extrusion forming at a temperature of 70 to 90° C. higher than the melting point of the resin, followed by drawing as far as possible, thereby obtaining a filament. Using the thus obtained filament, a non-woven fabric was prepared. The conditions are also shown in Table 11.

COMPARATIVE EXAMPLES 19 TO 21

The same procedures as in Examples 20 to 23 were followed to effect co-extrusion, except omitting the internal addition of the ceramics component (C) to the second resin (L) of the external component Y, followed by drawing as far as possible, thereby obtaining a filament (composite filament). Using the thus obtained filament, a non-woven fabric was prepared. The conditions are also shown in Table 11.

TABLE 11

| | Internal component X | | External component Y | | | Composite particles |
|---|---|---|---|---|---|---|
| | (H) | (A) | (L) | (A) | (C) | |
| Comparative Example 16 | (See Note 1) | | ($L_3$):94 parts | ($A_1$):6 parts | — | — |
| Comparative Example 17 | (See Note 1) | | ($L_4$):94 parts | ($A_1$):6 parts | — | — |
| Comparative Example 18 | (See Note 1) | | ($L_5$):94 parts | ($A_1$):6 parts | — | — |
| Comparative Example 19 | ($H_2$):50 parts | — | ($L_3$):46 parts - | ($A_1$):3 parts | — | — |
| Comparative Example 20 | ($H_4$):50 parts | — | ($L_4$):46 parts - | ($A_1$):3 parts | — | — |
| Comparative Example 21 | ($H_5$):50 parts | — | ($L_5$):46 parts - | ($A_1$):3 parts | — | — |
| Example 20 | ($H_2$):50 parts | — | ($L_3$):35 parts | ($A_1$):3 parts | ($C_3$):12 parts | Method 3 |
| Example 21 | ($H_4$):50 parts | — | ($L_4$):35 parts | ($A_1$):3 parts | ($C_4$):12 parts | Method 3 |
| Example 22 | ($H_2$):50 parts | — | ($L_4$):35 parts | ($A_1$):3 parts | ($C_4$):12 parts | Method 4 |
| Example 23 | ($H_5$):50 parts | — | ($L_5$):35 parts | ($A_1$):3 parts | ($C_4$):12 parts | Method 4 |

In Comparative Examples 16 to 18, monofilament (non-composite filament)
In Comparative Examples 19 to 21 and Examples 20 to 23, core-sheath joining type composite filament (Test)

The same tests as in Examples 20 to 23 were carried out. The results obtained are shown in Tables 12 and 13.

TABLE 12

| | Comparative Example | | | | | |
|---|---|---|---|---|---|---|
| | 16 | 17 | 18 | 19 | 20 | 21 |
| Before water washing Content of (A) (%) | 4.2 | 4.2 | 4.4 | 2.3 | 2.3 | 2.4 |
| After dipping in water | | | | | | |
| Content of (A) (%) | 0.7 | 0.7 | 0.8 | 0.2 | 0.2 | 0.3 |
| Deodorizing rate of $NH_3$ (%) | 55 | 55 | 56 | 44 | 43 | 45 |
| Antimicrobial properties | | | | | | |
| Number of bacteria, log C | 6.5 | 6.5 | 6.5 | 7.0 | 7.0 | 6.8 |
| Increase or decrease value | 1.5 | 1.5 | 1.5 | 2.0 | 2.0 | 1.8 |
| Difference in increase or Decrease value | 0.7 | 0.7 | 0.7 | 0.2 | 0.2 | 0.4 |

(For the Antimicrobial Properties Test, 0.2 g of the Sample was Collected.)

TABLE 13

| | Example | | | |
|---|---|---|---|---|
| | 20 | 21 | 22 | 23 |
| Before water washing | | | | |
| Content of (A) (%) | 2.6 | 2.4 | 2.6 | 2.7 |
| After dipping in water | | | | |
| Content of (A) (%) | 2.4 | 2.3 | 2.4 | 2.6 |
| Deodorizing rate of $NH_3$ (%) | 74 | 74 | 70 | 72 |
| Antimicrobial properties | | | | |
| Number of bacteria, log C | 3.8 | 4.1 | 4.2 | 4.1 |
| Increase or decrease value | −1.2 | −0.9 | −0.8 | −0.9 |
| Difference in increase or decrease value | 3.4 | 3.1 | 3.0 | 3.1 |

(For the Antimicrobial Properties Test, 0.2 g of the Sample was Collected.)

EXAMPLE 24

As raw materials of the resin (H) of the internal component X, the resin (L) of the external component Y, the functional component (A) to be internally added in the resin (L) of the external component Y, and the ceramics component (C) to be internally added in the resin (L) of the external component Y were prepared the following materials.

Further, composite particles comprising the functional component (A) having the ceramics component (C) supported thereon were obtained in the same procedures as in Method 1 as described above.

($H_3$): Polyethylene terephthalate (PET) having a melting point of 265° C.

($L_1$): Polyethylene terephthalate (PET) having a melting point of 265° C.

($A_1$): 30% Product of tea catechin ($C_1$): Silicate (water glass)

The resin (L) in the side of the external component Y was mixed with the functional component (A)-supported ceramics component (C) obtained in Method 1 as described above, together with small amounts of an antioxidant and a flocculation preventive (a dispersing agent), and the mixture was melt extruded and pelletized. The thus obtained pellets were used as the external component (sheath component) Y, and pellets of the resin (H) of the internal component X were used as the internal component (core component) X. The both pellets were subjected to co-extrusion under temperature conditions of 70 to 90° C. higher than the melting point of the resin (L) of the external component Y with respect to the external component (sheath component) Y and under temperature conditions of 70 to 90° C. higher than the melting point of the resin (H) of the internal component X with respect to the internal component (core component) X, respectively, from two extruders each equipped with a composite die, thereby obtaining a bimetal joining type film-like composite molding of a Y/X/Y layer construction. Thereafter, the resulting film-like composite molding was slit into thin strips. Using the thus obtained fibrous molding, a cloth was prepared. This cloth had deodorizing properties and antimicrobial properties same as in Example 13.

In the composite moldings according to the present invention, necessary moldability (e.g., melt spinning properties, etc.), next-processing properties (e.g., stretching properties, etc.), and physical properties (e.g., strength, dimensional stability, etc.), are obtained mainly by the internal component X, and surface characteristics and functionalities such as deodorizing properties, antimicrobial properties, physiological activity, and antioxidation properties are obtained by the external component Y. When the kind of the second resin (L) and the amount of the internally added components are selected or controlled, preferred heat fusion properties are obtained.

And, since in the external component Y, the functional component (A) is fixed and made waterproof in the co-existence of the ceramics component (C), bleeding of the functional component (A) internally added is effectively inhibited. Further, due to the functional component (A) present in the external component Y, superior functionalities that the functional component (A) inherently possesses, such as deodorizing properties and antimicrobial properties, are exhibited at the maximum. Moreover, even when the composite molding is used in a state in which it is brought into contact with water or washed with water, since the functional component (A) does not readily elute out, the functionalities are maintained over a long period of time. The presence of the ceramics component (C) also contributes to the dimensional stability and heat resistance of the filament against circumferential changes such as temperature and humidity changes.

Further, since it is only a requirement that the functional component (A) is present in the external component Y in the surface side, the internal addition amount of the functional component (A) can be largely reduced, leading to an advantage from the economic standpoint.

In addition, since various combinations of resins for the first resin (H) of the internal component X and the second resin (L) of the external component Y can be employed, it is possible to obtain composite moldings having mechanical characteristics, thermal nature, and surface nature, which meet the needs.

Besides, since the functional component (A) is a component contained in a tea or the like, it is safe even when the filament is used in a state in which it is brought into contact with a human body.

While the invention has been described in detail and with reference to specific examples thereof, it will be apparent to one skilled in the art that various changes and modifications can be made therein without departing from the spirit and scope thereof.

What is claimed is:

1. A joining type composite molding comprising an internal component X and an external component Y, the internal component X being formed from a first resin (H);

the external component Y being formed from a second resin (L) compounded with at least one functional component (A) selected from the group consisting of a catechin, a saponin, a tea-leaf powder, a tea-leaf extract and tannin (tannic acid), and wherein at least one of the first resin (H) and the second resin (L) is a non-polyolefinic resin.

2. The composite molding as claimed in claim 1, wherein said non-polyolefinic resin is selected from the groups consisting of: polyamide-based resins, polyester-based resins, polyurethane-based resins, polyvinyl chloride-based resins, polyvinylidene chloride-based resins and acrylic resins.

3. The composite molding as claimed in claim 1, wherein the external component Y is formed from the second resin (L) having the functional component (A) and further comprises a ceramics component (C) compounded therein in a state of composite particles.

4. The composite molding as claimed in claim 1, which is a core-sheath joining type composite molding comprising the internal component X as a core component and the external component Y as a sheath component.

5. The composite molding as claimed in claim 1, which is a bimetal joining type composite molding constructed of the internal component X and the external component Y in a Y/X or Y/X/Y state.

6. The composite molding as claimed in claim 1, further comprising a ceramics component (C) that is selected from:

a silica gel obtained via a hydrous silicate gel, a combination of an inorganic sintering aid and an inorganic flocculant, a combination of ceramics particles, an inorganic sintering aid and an inorganic flocculant, or a water-swelling clay mineral.

\* \* \* \* \*